United States Patent [19]

Stearns et al.

[11] 3,818,149

[45] June 18, 1974

[54] PROSTHETIC DEVICE FOR PROVIDING CORRECTIONS OF AUDITORY DEFICIENCIES IN AURALLY HANDICAPPED PERSONS

[75] Inventors: William P. Stearns; Vernon O. Blackledge, both of Scottsdale; John S. Rohrer, Tempe, all of Ariz.

[73] Assignee: Shalako International, Inc., Scottsdale, Ariz.

[22] Filed: Apr. 12, 1973

[21] Appl. No.: 350,415

[52] U.S. Cl. .......................... 179/107 FD, 179/1 D
[51] Int. Cl. .......................... H04r 25/00
[58] Field of Search .......... 179/107 R, 107 FD, 1 D

[56] References Cited

UNITED STATES PATENTS

| | | | |
|---|---|---|---|
| 2,783,312 | 2/1957 | Mouzon | 179/107 FD |
| 3,531,596 | 9/1970 | Yagher | 179/1 D |
| 3,539,725 | 11/1970 | Hellwarth | 179/1 D |
| 3,700,811 | 10/1972 | Davidson | 179/1 D |
| 3,752,928 | 8/1973 | Flickinger | 179/1 D |
| 3,764,745 | 10/1973 | Bottcher | 170/107 FD |

*Primary Examiner*—Ralph D. Blakeslee
*Attorney, Agent, or Firm*—Lyon & Lyon

[57] ABSTRACT

Electronic circuitry for providing compensatory amplification for aurally handicapped persons. The electronic circuitry divides the audible frequency spectrum into a plurality of adjacent frequency bands through the use of an adjustable filter network to provide compensatory amplification in a prosthetic device in a practical wearable form.

19 Claims, 9 Drawing Figures

PATENTED JUN 18 1974

3,818,149

SHEET 1 OF 4

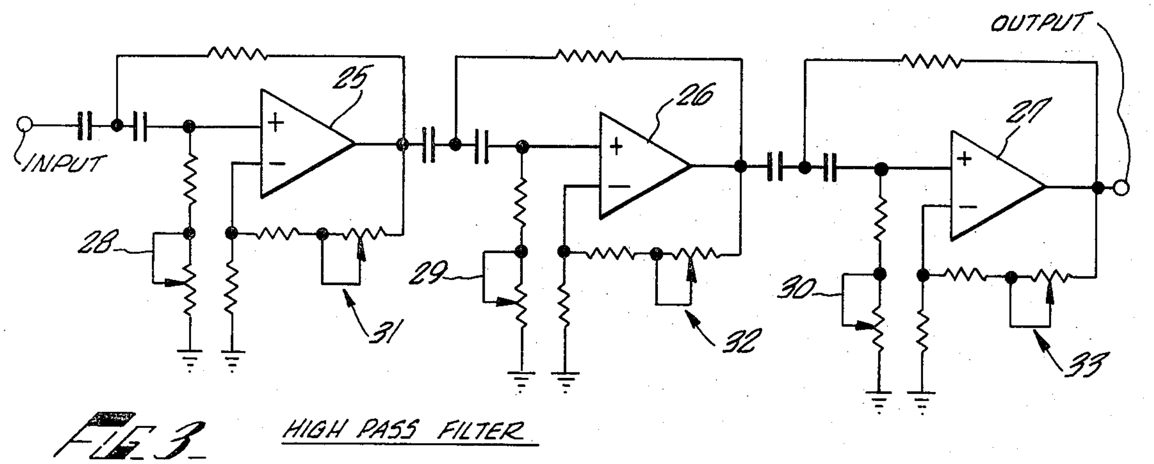
FIG. 3 HIGH PASS FILTER
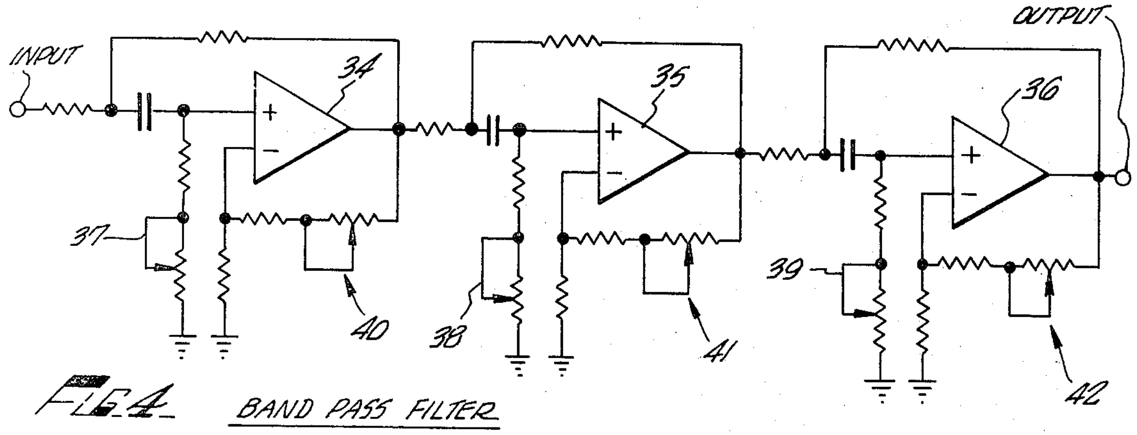
FIG. 4 BAND PASS FILTER
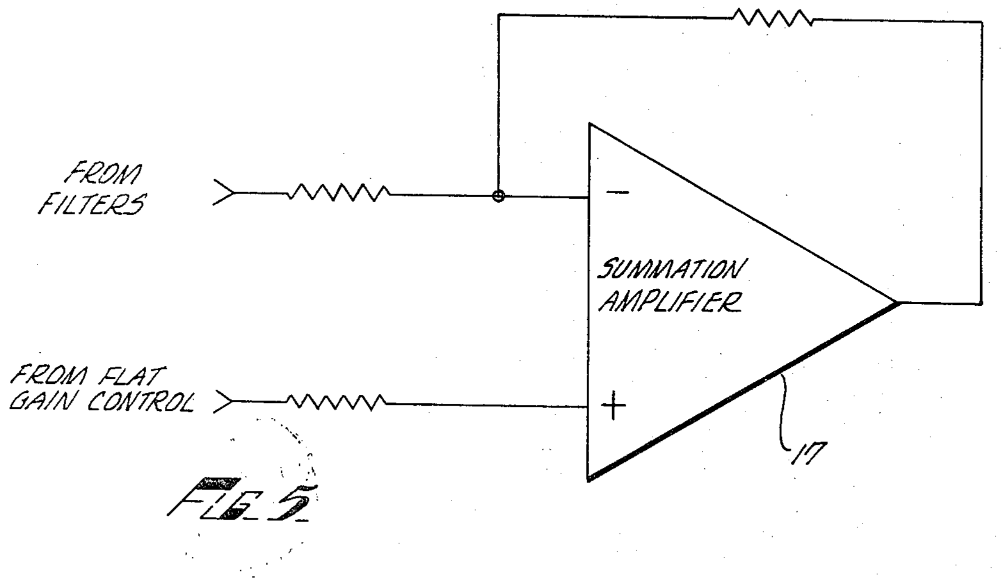
FIG. 5

HIGH PASS RESPONSE

BAND PASS RESPONSE

PROSTHETIC DEVICE FOR PROVIDING CORRECTIONS OF AUDITORY DEFICIENCIES IN AURALLY HANDICAPPED PERSONS

CROSS REFERENCE TO RELATED APPLICATIONS

The present application is directed to inventive concepts which are related to those described in co-pending application Ser. No. 133,229, filed Apr. 12, 1971 by William P. Stearns and entitled, "Method and Apparatus for Providing Electronic Sound Clarification for Aurally Handicapped Persons". The present application also is related to co-pending applications, Ser. No. 229,322, filed Feb. 25, 1972, in the names of William P. Stearns and John K. Lauchner entitled, "Apparatus and Prosthetic Deficiencies for Aurally Handicapped Persons", and Ser. No. 229,398, filed Feb. 25, 1972, in the names of William P. Stearns and Barry S. Elpern entitled "Method for Providing Electronic Restoration of Speech Discrimination in Aurally Handicapped Persons". The present application also is related to the co-pending application Ser. No. (LYON & LYON Docket No: 139/107) concurrently filed herewith in the names of William P. Stearns and Barry S. Elpern entitled "Method of Fitting a Prosthetic Device for Providing Corrections of Auditory Deficiencies in Aurally Handicapped Persons", which describes and claims methods disclosed herein. All of the above cited applications are assigned to the assignee of the present application and the disclosures thereof are incorporated herein by reference.

BACKGROUND OF THE INVENTION

This invention relates to the sound amplification arts and to their application in the amelioration of auditory deficiencies resulting from damage to the sensori-neural structure of the human ear. It relates particularly to apparatus for correcting deficiencies in a person's ability to perceive and to comprehend spoken language.

Sensori-neural hearing loss is generally considered to be the most prevalent type of auditory handicap found in the United States as well as in other civilized cultures. It constitutes a significant barrier to adequate communication in 5 to 10 percent of the total United States population, and in more than 50 percent of the population over 60 years of age. Furthermore, these proportions are expected to increase in conjunction with ongoing increases in ambient noise levels and life expectancy in our society.

Sensori-neural impairment may result from any one or more of a number of causes, including, but not limited to, genetic and congenital factors, viral diseases, specific toxic agents, circulatory disturbances, specific physical trauma and excessive exposure to noise. Irrespective of the primary cause, however, sensory cells within the organ of hearing or their associated neural units suffer some degree of damage and are rendered partially or totally incapable of fulfilling their respective roles in the processing of auditory information. This form of damage cannot be repaired by means of currently known medical or surgical techniques, and the probability of discovery of effective techniques within the foreseeable future appears rather remote. Thus, in virtually all cases of sensori-neural hearing loss, amplification of incoming sounds represents the only possible means for restoring adequate hearing ability.

Hearing loss resulting from sensori-neural damage is usually irregular with respect to frequency, being selectively greater for particular portions of the audible frequency range. The ability to hear sounds in the range above 1000 Hz is often affected more than the hearing of sounds below 1000 Hz, although this is by no means a universal observation. The ultimate consequence of irregular hearing acuity for various portions of the audio frequency spectrum is distortion in the perception of complex sounds, i.e., sounds composed of a number of different frequencies.

A certain amount of distortion in complex sounds may b tolerable, but current information does not permit precise specification of the maximum amount of each type of distortion which may exist without interfering materially with accurate sound recognition. Many gross sounds, for example, do not demand a great deal of analytic power in the auditory system, so even a rather severely impaired system may function adequately in the interpretation of such sounds.

In audiologic parlance, the term "discrimination" denotes the capacity of the ear to analyze incoming acoustic patterns and interpret them appropriately. Analytic power may fail at any of several stages in the auditory process, commonly in the organ of hearing or first order neurons due to damage. to these structures. Since the ear may be required to perform many degrees of discrimination, varying from extremely course to extremely fine, its analytic power may be measured through the use of tests which demand auditory discriminations of progressive difficulty until failure occurs.

Among the most difficult discriminations required of the human ear are those necessary for accurate interpretation os speech, particularly speech in the presence of noise. Because of the fundamental importance of spoken communication, it is obvious that chronic inability to understand what people say could profoundly influence an individual's social, economic and cultural well-being. Tests of speech discrimination are commonly employed, therefore, to derive a realistic estimate of a person's everyday functional adequacy in hearing.

Each of the phonic units of a spoken word is a complex sound, composed of several frequencies clustered in a more-or-less definable range. When the acuity of the ear has been selectively impaired in a specific frequency range, speech sounds or their components falling in that range may be heard at a reduced intensity or not at all. Impairment in several frequency ranges compounds the difficulty and is probably responsible in large measure for the primary complaint of the individual with sensori-neural hearing loss, that he can hear a speaker's voice but cannot understand what is said. The mechanism for inhibiting such understanding may be the non-linear responses that result in intermodulation products and harmonics which could cause interference with the desired spectral components of speech.

On the basis of the foregoing information, it would seem quite reasonable to deal with sensori-neural hearing loss by selective spectrum amplification; that is, providing amplification only in those frequency ranges or bands in which acuity is deficient, and only in the amount of the deficiency. Thus, the ultimate value of selective spectrum amplification rests on the application of appropriate methods for measuring the degree of auditory deficiency as a function of various frequency bands, and also on the construction of a wearable device which is fully capable of producing amplification to compensate for the measured deficiencies. Because of existing inadequacies in both respects, the principle of selective amplification has fallen into disrepute, for the hearing aid industry has adopted the pure tone (single frequency) threshold audiogram as the criterion measurement, and has produced hearing aids with inadequate capabilities for providing proper acoustic output at each portion of the audio band.

The threshold audiogram curve represents an individual's measured absolute auditory threshold for a series of pure frequency tones, usually in the range of 250 Hz to 8000 Hz sampled at octave intervals on the assumption that intra-octave tone thresholds follow the general audiogram contour. However, it is demonstrable that fairly marked departures from this overall pattern may exist at intermediate frequencies, i.e., frequencies between pure tones one octave apart.

The rationale for utilizing threshold measurements is shrouded in history, but it is exceedingly interesting to note that the analogous procedure of measuring visual thresholds for monochromatic (single color) lights is never performed to measure the visual acuity of the eye or to prescribe eye-glasses. In fact, careful consideration of the types of measurements which are genuinely helpful in guiding the design of particular hearing aid features suggests that the pure tone threshold curve is virtually useless for several reasons:

A. Under everyday circumstances, individuals react only to supra-threshold sounds, as these are the sounds of primary significance. For practical purposes, threshold sounds remain unnoticed.

B. The contour of an individual's threshold curve is observably different from the contour of his supra-threshold equal loudness curves or comfortable listening level curves.

C. An individual's recognition of complex phonic units or their combination into spoken words is essentially unrelated to his acuity for individual pure tones.

Control of acoustic output in current hearing aids is ordinarily achieved through manipulation of frequency response, which refers to the acoustic output of a sound transmission system at each of the frequencies within its pass band when the input level is maintained constant for all frequencies. A graphic representation of a system's frequency response is referred to as a response characteristic, curve or contour. Manufacturers commonly claim that they are able to build hearing aids to yield any required frequency response; but this does not appear to be the case in practice because there are definite limitations on the bandwidths and response curves available in present day aids. In practice, manufacturers use combinations of components which produce a limited choice of response patterns and simply select one which most closely corresponds to the criterion, which as mentioned earlier, usually is a threshold audiogram curve.

One additional comment is relevant as a preface to the innovative concepts to which the present invention is particularly addressed. It is generally recognized that the ear with sensori-neural hearing loss is excessively susceptible to overloading, which is to say that, although it may be relatively insensitive to sounds of low or moderate intensity, it is hypersensitive to sounds of higher intensity (i.e., non-linear response characteristics). This condition restricts the useful operating range of the ear, referred to as the dynamic range; that is, the decibel difference between the lowest intensity at which a sound is reliably detected (absolute threshold) and the upper limit of comfortable loudness for that sound (discomfort threshold).

Whereas the dynamic range of the normal ear is of the order of 100 dB, the range of a sensori-neurally impaired ear may be as little as 10 or 15 dB, generally over a limited frequency spectrum range. Thus, for an impaired ear to function with any degree of adequacy, the full intensity range of the outside acoustic world must be restricted in some way to fit through an abnormally small sound window and such restriction must cause minimal intermodulation products, harmonics, an so forth which would result in distortion. Without such restriction, the ear is readily overloaded, leading to psychologic or physical annoyance and distortion of incoming acoustic patterns.

The consequences of overloading have been appreciated for many years, and output compression devices are widely used in today's hearing aids. Without exception, however, these devices operate on a broad frequency band, so that when any frequency component of a signal reaches a predetermined critical level, the entire pass band of the hearing aid is compressed. Consequently, the components which are not at a critical intensity are needlessly attenuated.

Our evaluation of relevant factors has led to the evolution of several innovative concepts concerned with improved methods and apparatus for measuring and describing auditory deficiency for purposes of prescribing compensatory amplification, and with improved methods and apparatus for providing such compensatory amplification in practical and wearable form. An especially noteworthy concept is an automatic gain control that is associated with the filter network and a separate automatic gain control that is associated with the broadband pre-amplifier.

It has been pointed out earlier that attempts to compensate for a subject's hearing loss by adjusting the frequency response of an acoustic amplification system so that such response mirrors the subject's absolute auditory threshold are largely futile, simply because humans do not attend to threshold stimuli in real-life listening situations. Only supra-threshold stimuli are of significance to the subject, and it is well known that the frequency response of the ear to supra-threshold stimuli is markedly different form it's response to threshold stimuli. Ideally, then, an acoustic amplification system designed to compensate for hearing loss should provide a frequency response which varies so that it is appropriate for low intensity stimuli when low intensity stimuli are present, and for high intensity stimuli when high intensity stimuli are present. In its practical application, the present invention is intended primarily, though not exclusively, for subjects who have relatively little loss of hearing in the low and middle frequency ranges, and relatively great loss of hearing in the higher frequency range. This pattern is the most prevalent of all hearing loss types, and, because of the relatively great loss of sensitivity for high frequencies, there is necessarily a reduced dynamic range for high frequencies. This is to say that there is a smaller range of intensities between the absolute threshold and the discomfort threshold which may be utilized for amplification purposes.

SUMMARY OF THE INVENTION

While the present application and the previously-mentioned, concurrently-filed application include similar disclosures, for the sake of completeness, the claims of the present application are particularly directed to electronic circuits of the nature disclosed herein and equivalents thereof for enabling the objectives set forth herein to be accomplished. Accordingly, it is an objective of the present application to provide an electronic correction system with the following capabilities:

a. Division of the audible frequency spectrum into two or more adjacent frequency bands through the use of a filter network. The width and location of these bands are adjustable. They can be set so as to closely fit the patient's required response curve. This required curve may be determined by the method as defined in the previously-mentioned Patent Application Ser. No. 229,309 entitled "Method for Providing Electronic Restoration of Speech Discrimination in Aurally Handicapped Persons" in the names of Stearns and Elpern, filed Feb. 25, 1972, which application is assigned to the assignee of the present application and the disclosure of which is incorporated herein by reference;

b. specific and individual intensity or volume control associated with each of the frequency bands defined in (a) above;

c. specific and individually adjustable output compression associated with each of the bands defined in (a) above;

d. electro-mechanical transduction of electronically processed signals into acoustical signals, such transduction occurring within the external auditory canal of the test subject; and e. pre-amplification and mixing of input signals for broadband intensity control.

Another object of this invention is to enable the provision of sufficiently miniaturizing hearing aid apparatus for wearing by aurally handicapped persons to be accomplished by electronic techniques.

BRIEF DESCRIPTION OF THE DRAWINGS

The invention both as to its organization and principle of operation together with further objects and advantages thereof may better be understood by referring to the following detailed description of an embodiment of the invention when taken in conjunction with the accompanying drawings in which:

FIG. 3 is a circuit diagram of a highpass filter network utilized in accordance with this invention.

FIG. 4 is a circuit diagram of a bandpass filter network utilized in accordance with this invention.

FIG. 5 is a circuit diagram for an alternate embodiment of a summing amplifier in accordance with this invention.

DESCRIPTION OF A PREFERRED EMBODIMENT

Figure 1:
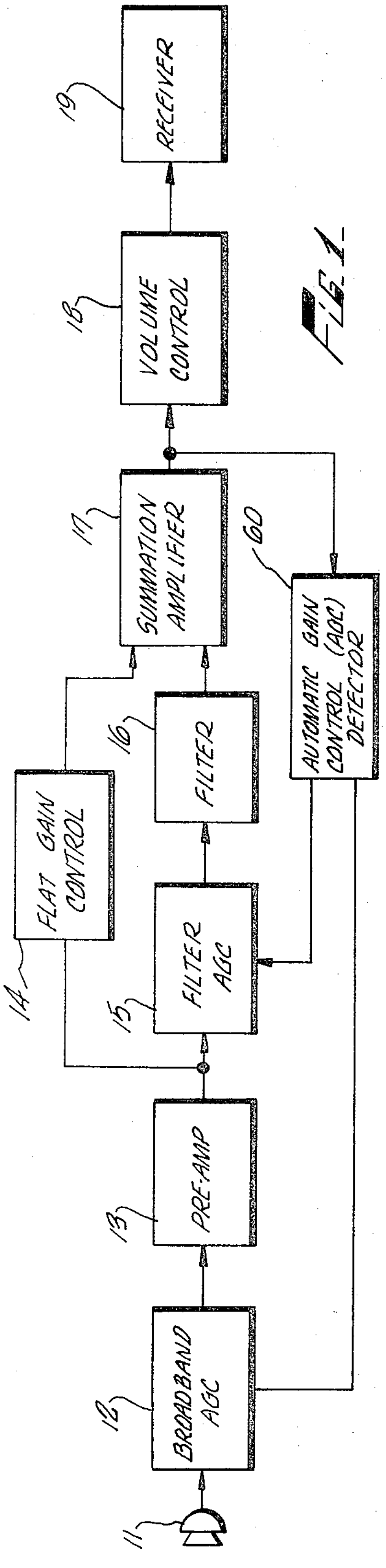
FIG. 1 is a block diagram illustrating an exemplary embodiment of the basic concepts utilized in the present invention to provide compensatory amplification in accordance with this invention.

Referring now to FIG. 1, a basic hearing aid is illustrated which can be employed to duplicate a subject's required response curve. The resulting hearing aid will be wearable and may be as small as practical and readily adapted to be manufactured in a miniaturized wearable form. The basic components of such a hearing aid include a transducer, such as a miniature ceramic microphone 11, including a built-in low noise, field effect transistor amplifier. A unit similar to the Knowles BL-1617 may readily be employed in the practice of this invention as a suitable transducer stage. Such a unit has a frequency response from less than 100 Hz to greater than 8000 Hz, as measured by standard hearing aid microphone measurement techniques. Microphone 11 is such a unit and receives power for its built-in field effect transistor (FET) amplifier from a 1.3 volt DC source. The output of the microphone 11 is connected to an input of a broadband automatic gain control (AGC) 12.

The broadband AGC output is connected to an input of a preamplifier 13. Preamplifier 13, as is well known in the art, may incorporate an internally compensated circuit, such as an integrated operational amplifier similar to Fairchild 776. The preamp 13 may precede the broadband AGC 12 without altering the effect of the units. The preamp 13 may also be an integral part of the broadband AGC 12. The output of the preamp 13 is connected to an input of a flat gain control 14 and an input of a filter AGC 15.

The output of the filter AGC 15 is connected to an input of a filter network 16 which may be an active filter network. The filter network 16 comprises a filter arrangement such as a highpass filter (in FIG. 3) or a bandpass filter (in FIG. 4) and may include a plurality of filters or filter types to provide flexibility to achieve individualized, auditory compensation. The broadband AGC 12 provides compression over the whole audio spectrum (to prevent loud inputs from producing discomfort and/or amplifier saturation), and the filter AGC 15 provides for additional compression control over a predetermined portion of the audio spectrum which depends upon the selected filter network 16. Thus the dual AGC system 12 and 15 provides two functions: 1) it prevents discomfort and/or amplifier saturation and 2) it provides decreasing high-frequency emphasis for louder sounds. Previously mentioned applications Ser. No. 229,322 and Ser. No. 229,398 described the importance of fitting the filter curve to a patient's conversation-level loudness curve and not to his threshold-level curve. Thus, filter AGC 15 allows the fitting to both these curves simultaneously. The filter AGC 15 and the filter 16 can be interchanged without affecting performance.

The output of the flat gain control 14 is connected to a first input of a summation amplifier 17. The output of the filter 16 is connected to a second input of the summation amplifier 17. The signals at the first and second inputs of the summation amplifier 17 are linearly summed in the summation amplifier 17. The output of the summation amplifier 17 is connected to an input of a volume control 18, which attenuates the output signals from the summation amplifier 17 before feeding the signals to a miniature magnetic receiver 19. The output of the summation amplifier 17 is also connected to an input of an automatic gain control detector 60, which in turn is connected at its output to a second input of the broadband automatic gain control 12 and a second input of the filter automatic gain control 15.

In operation, a DC supply, such as rechargeable or long-life batteries, provides a power source which allows the acoustical input signals to be fed from the microphone 11 to the broadbend AGC 12.

The preamplifier 13 and the associated broadband automatic gain control 12 amplify and compress the signals from the microphone 11 and drive the filter AGC 15 and the flat gain control 14. The filter automatic gain control 15 compresses the filtered frequencies by an amount determined by the automatic gain control detector 60. The filter network 16 has an active bandpass or highpass filter configuration dependent on the patient's hearing problem, such as determined by the method claimed in the previously mentioned, concurrently-filed, application (LYON & LYON Docket 139/107). The two signals from the flat gain control 14 and the filter network 16 are each fed to the summation amplifier 17 to be summed and fed thru the volume control 18 to drive the receiver 19. The automatic gain control detector 60 samples the output of the summation amplifier 17 to provide control signals to the broadband automatic gain control 12 and the filter automatic gain control 15 to control the overall compression and the filter compression.

The wearable hearing aid described herein permits a substantial size reduction. Ease of repair, ruggedness, and waterproof scaling of the electronic circuits can be readily accomplished. Attractive and compact packaging for post-auricular (behind the ear) fittings can be provided in that the total circuit herein discussed is readily adaptable to commonly known integrated circuit techniques.

Figure 2:
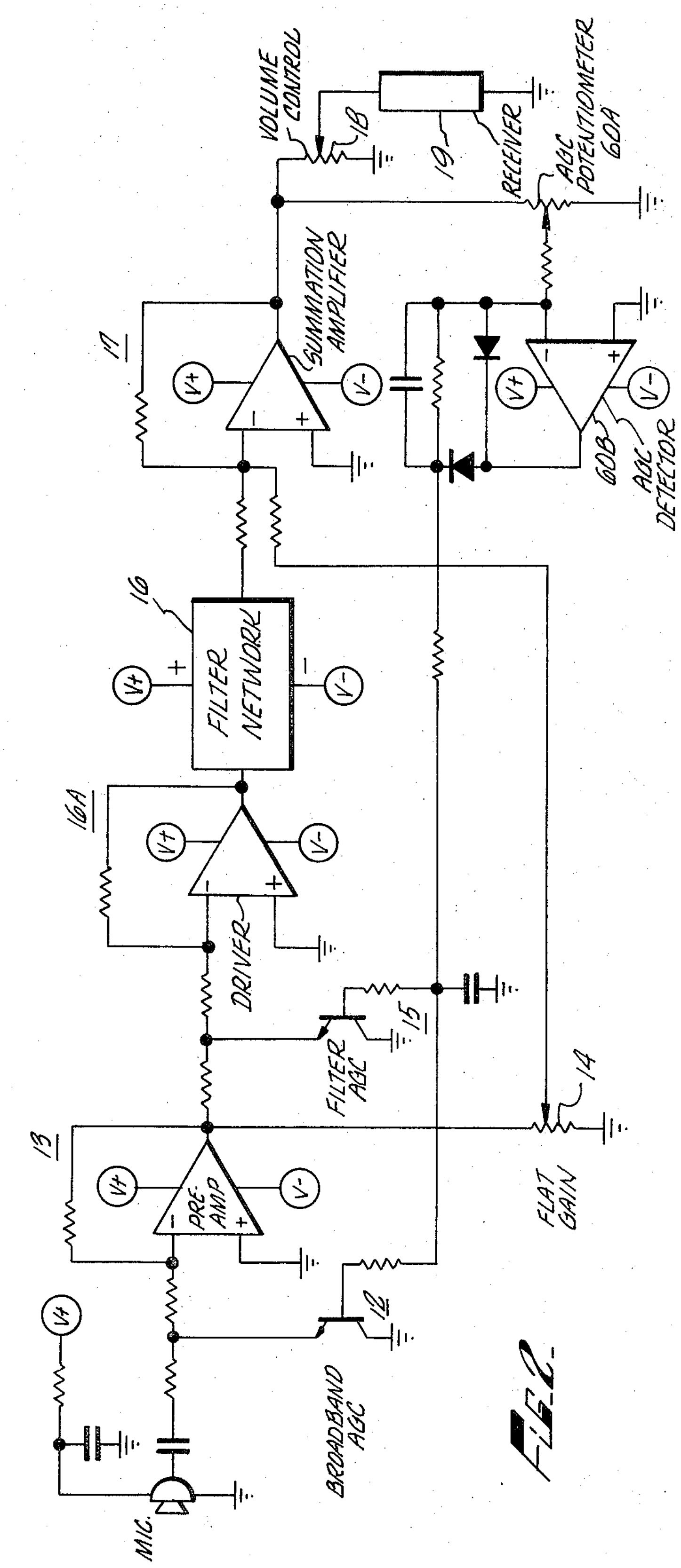
FIG. 2 is a circuit diagram of an exemplary embodiment of the basic concepts utilized in the present invention to provide compensatory amplification in accordance with this invention.

Referring now to a more specific discussion of the electronics circuitry utilized in the practice of this invention, the circuit of FIG. 2 illustrates the miniature ceramic microphone 11 which includes a built-in, low noise, field effect transistor amplifier and is utilized as an input transducer. The input signals received at the microphone 11 are fed through the broadband automatic gain control network 12 to an input of an operational amplifier, which serves as the preamplifier 13. The output of the preamplifier 13 is passed through the filter automatic gain control network 15 to the input of a filter driver 16A. The output of the preamplifier 13 also is connected to the flat gain control 14. Filter network 16 receives its input from the filter driver 16A and in turn is connected to an input of an operational amplifier employed at the summation amplifier 17. A second input of the summation amplifier 17 is connected to the flat gain control 14. The output of the summation amplifier 17 is connected to the volume control 18, which in turn is connected to the receiver 19. The output of the summation amplifier 17 is also connected to the input of an automatic gain control potentiometer 60A, which is connected to the input of a peak detector circuit 60B, the two of which serve as the automatic gain control detector 60.

The operational amplifiers of FIG. 2 may be any state-of-the-art units such as Fairchild 776, which uses a 2.7V supply; or units that operate from a single 1.3V supply, or any number of similar units.

The circuit of FIG. 2 preferably employs a miniature magnetic receiver 19 at the output of the summation amplifier 17. Various miniature magnetic receivers can be connected to a driver circuit of a hearing aid, depending on the patient's requirements, i.e., for persons requiring more volume, larger diaphragm receivers can be used. Smaller receivers capable of being placed entirely within the ear channel can also be driven by the same driver stages.

In FIG. 2, the negative input of the amplifier 17 is used to sum both signals from the flat gain control 14 and the filter network 15. This provides same-polarity summing. If an operational amplifier with differential inputs is used, it is also possible to sum the input from the filter network 16 into the negative (inverting) input and the input from the flat gain control 14 into the positive input and the input from the flat gain control 14 into the positive (non-inverting) input to provide opposite polarity summing as is illustrated in FIG. 5. This may be necessary dependent upon the filter characteristics.

In FIG. 5, the summation amplifier 17 has the input from the flat gain control connected to its positive (non-inverting) input and the input(s) from the filter(s) connected to its negative (inverting) input. This allows a smoother frequency response when used with some types of filters.

FIG. 3 illustrates a 6-pole highpass filter, including three operational amplifiers 25, 26 and 27 in an active filter configuration. A suitable filter has its break frequency capable of being placed anywhere from 200 Hz to 10,000 Hz. Adjusting the proper resistors (28, 29 and 30) determines the precise break frequency, and adjusting the proper resistors (31, 32, 33) determines the Q of each two-pole section. The output of the highpass filter is linearly summed with the output of the flat gain control in the summation amplifier as previously described.

Referring now to FIG. 4, there is illustrated a six-pole bandpass filter including three operational amplifiers 34, 35 and 36 in an active filter configuration. As in FIG. 3, any filter can be designated such that its center frequency can be placed between 200 Hz to 10,000 Hz. Adjusting the proper resistors (37, 38 and 39) determines the precise center frequency, and adjusting the proper resistors (40, 41 and 42) determines the Q of each two-pole section. The output of the bandpass filter is linearly summed with the output of the flat gain control in the summation amplifier as previously described. As in FIG. 3, the filters utilized may have a gain of from 0 dB to 40 dB or more. A typical gain in an embodiment of this invention would be 30 dB.

Figure 6:
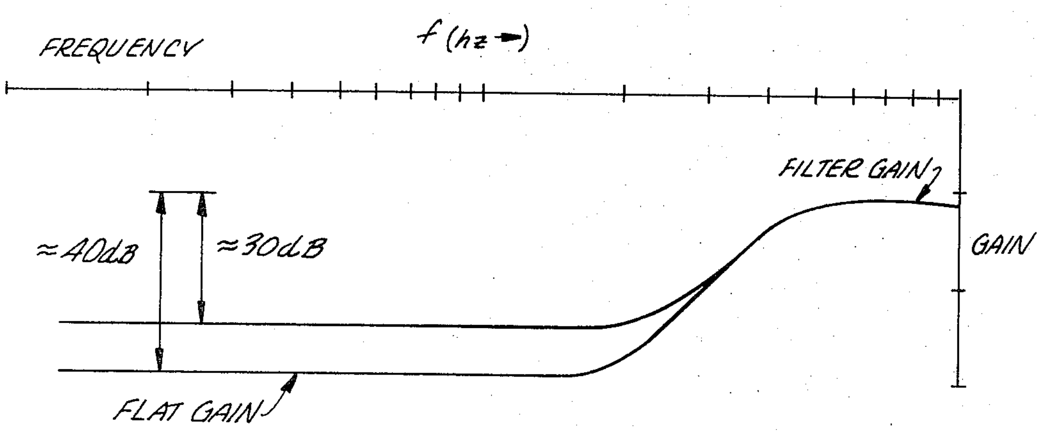
FIG. 6 is a diagram of highpass response curves in accordance with this invention.
Figure 7:
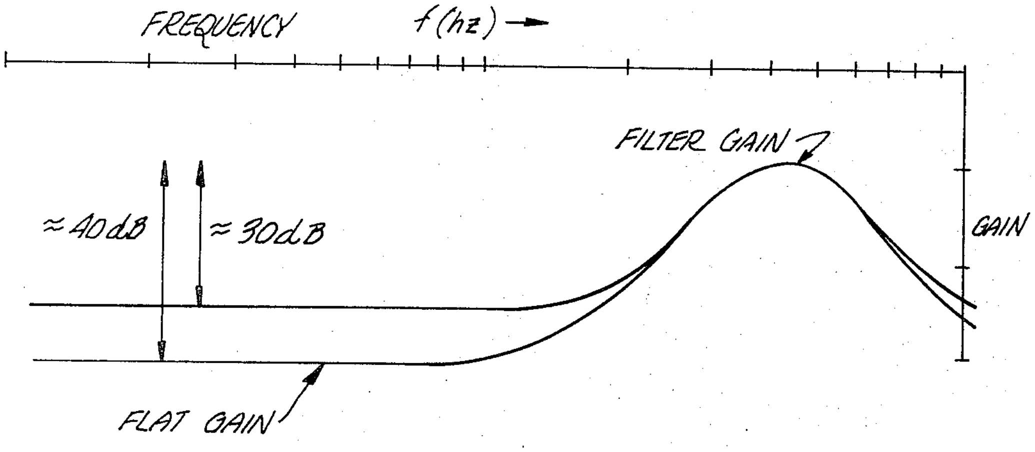
FIG. 7 is a diagram of bandpass response curves in accordance with this invention.

FIG. 6 and FIG. 7 illustrate highpass and bandpass response curves respectively. Further, FIGS. 6 and 7 illustrate how the flat gain can be adjusted in relationship to the filter gain. Once the filter has been tuned, a definite frequency response is obtained. The flat gain control provides a convenient method for raising or lowering the flat gain area of the curves in FIGS. 6 and 7 in relationship to the filter gain area. FIG. 6 and 7 both illustrate two different flat gain control settings. The flat gain control settings being at approximately 30 and 40 dB.

The filter network 16 of FIG. 2 may be comprised of two-pole, three-pole, four-pole, five-pole, six-pole or greater, highpass or bandpass filter configurations or combinations thereof to provide the desired response. More poles are generally required to provide steeper slopes.

Figure 8:
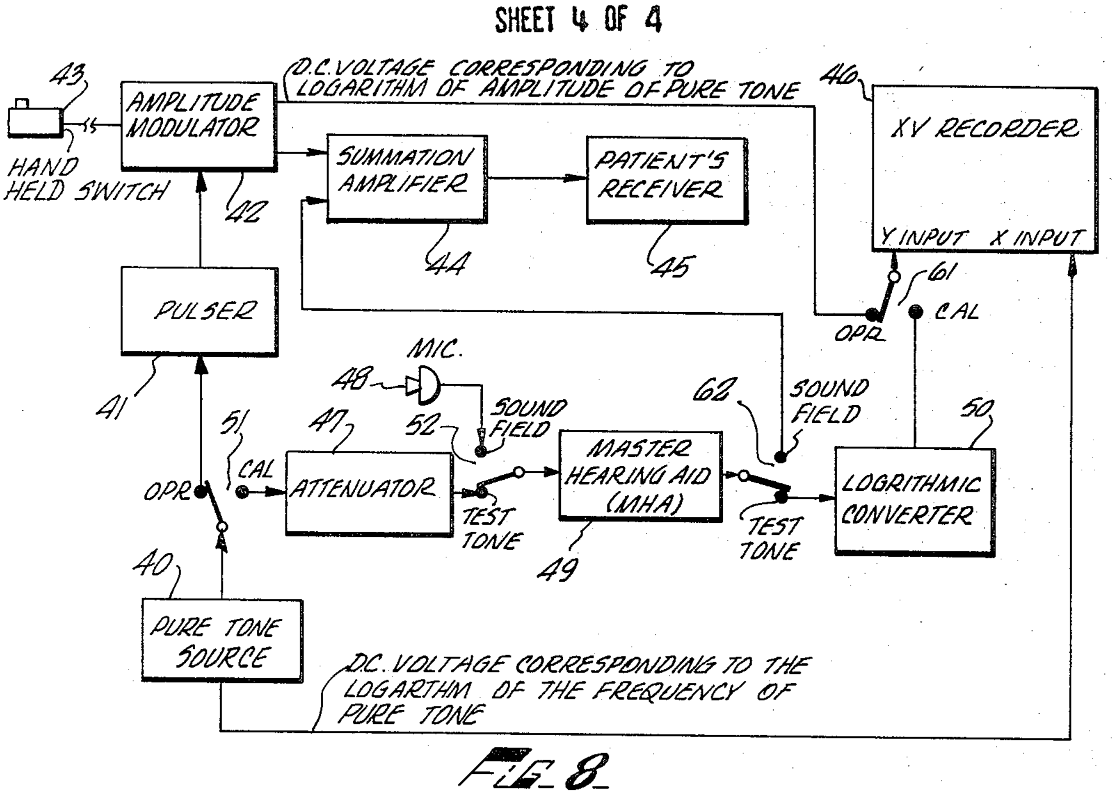
FIG. 8 is a system block diagram of apparatus for the testing method utilized in accordance with this invention.

Referring now to the system block diagram of FIG. 8, in the operate mode, a pure tone source 40 (such as a Wavetek 135) is connected through a switch 51 to an input of a pulser 41, which in turn is connected at its output to an input of an amplitude modulator 42. The pulser 41 gates the tone from the source 40 approximately 2 Hz and a 50 percent duty cycle.

The amplitude modulator 42 varies the magnitude of the pure tone from the pulser 41 exponentially with time (or with DC control voltage) at a rate of approximately 2 dB per second, increasing if an associated hand held switch 43 is not pressed. The amplitude modulator 42 possesses a dynamic range of 120 dB in order to permit traversal of virtually the entire range of human hearing (typically 134 to 140 dB SPL at 1 KHz). The amplitude modulator 42 is fed to a first input of a summation amplifier 44, the output of which is connected to a patient's receiver 45. A DC voltage which corresponds to the logarithm of the amplitude of the pure tone is fed to the Y input of an XY recorder 46 in the operate mode through a switch 61. A suitable XY recorder 46 is the Esterline Angus XY 8511. A second output from the pure tone source 40, which corresponds to the logarithm of the frequency of the pure tone, is connected to the X input of the XY recorder 46. The pure tone source 40 is designed to automatically sweep exponentially from 100 Hz to 10,000 Hz, at a sweep speed of approximately one octave per minute.

In a calibration mode the output from the pure tone source 40 is connected through the switch 51 to an input of an attenuator 47 which provides means for attenuating the tone to be fed to an input of the Master Hearing Aid (MHA) 49 through a switch 52 (with a "sound field" and a "test tone" mode). The output of the MHA 49 in the calibrate and test tone mode is connected through a switch 62 (with a "sound field" and a "test tone" mode) to an input of the log converter 50. The log converter 50 provides a DC voltage, through switch 61 to the Y input of the XY recorder 46, corresponding to the logarithm of the amplitude of the pure tone output of the Master Hearing Aid 49. With the pure tone source 40 set to sweep, the response to the MHA 49 is plotted on the XY recorder 46.

Figure 9:
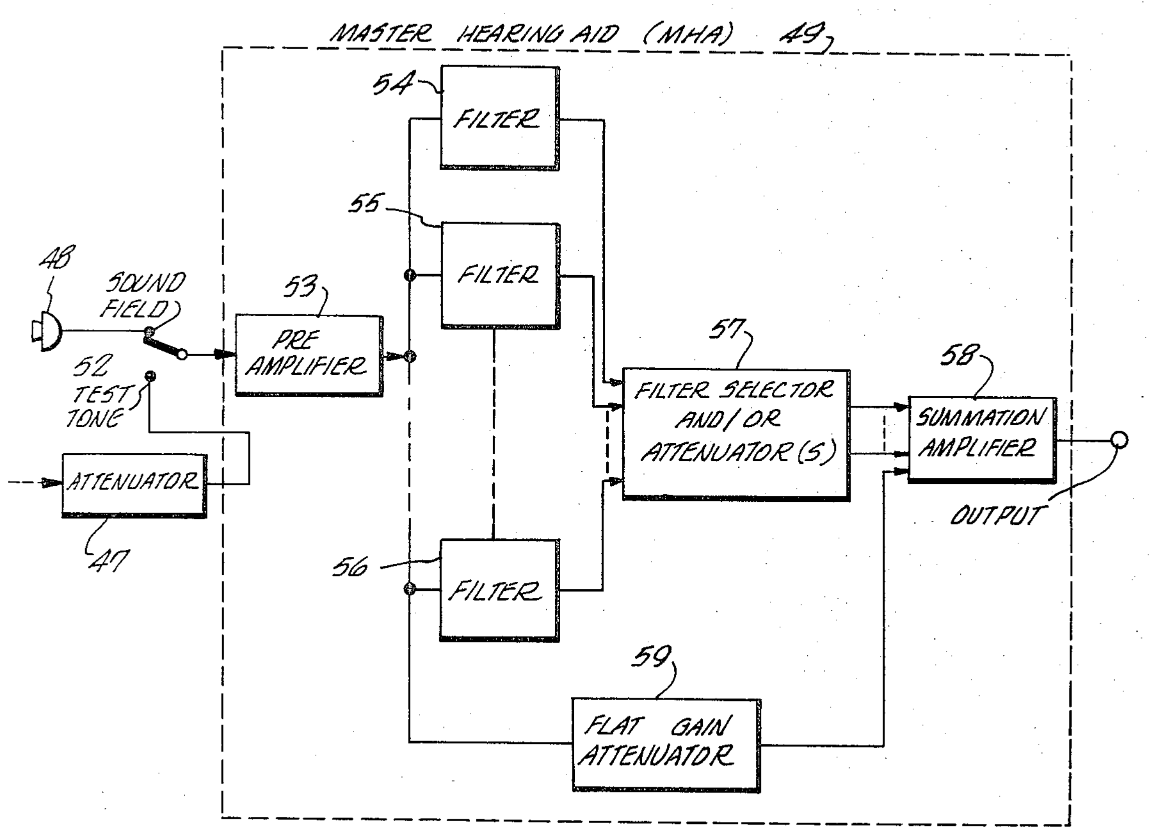
FIG. 9 is a system block diagram of apparatus including details of the master hearing aid unit in the system of FIG. 8 of the testing method in accordance with this invention.

FIG. 9 includes details of the Master Hearing Aid 49. A ceramic microphone 48, which includes a built-in field effect transistor, is connected to an input of a microphone preamplifier 53 in the Master Hearing Aid 49 when the switch 52 is in the sound field mode. The preamplifier 53 provides amplification prior to signals reaching a filter network. The signals from the output of the preamplifier 53 takes two routes, one through the filter network illustrated as filters 54, 55, 56 and one route through a flat gain attenuator 59.

The outputs of the filters 54, 55 and 56 (three filters being chosen for convenience of illustration) are connected to inputs of a filter selector and/or attenuators unit 57. The unit 57, depending on the Master Hearing Aid 49, might select a single filter, or on another Master Hearing Aid unit, might attenuate each of a plurality of filters separately.

The output (or outputs) of unit 57 is connected to a first input of a summation amplifier 58, and an output of the flat gain attenuator 59 is connected to a second input of the summation amplifier 58. The signals from the two previously mentioned routes arrive at the summation amplifier 58 and, at the output thereof, are fed through switch 62, in its sound field mode, and summation amplifier 44 to an associated receiver such as the patient's receiver 45, all as illustrated in FIG. 8.

In operation and referring to FIG. 8 in the operate mode, to obtain an absolute auditory threshold curve, the test stimulus from the pure tone source 40 is a pure tone of gradually increasing frequency from approximately 200 Hz to 10,000 Hz, pulsed at a rate of two pulses per second by the pulser 41. The subject controls the intensity of the tone by means of the hand held switch 43 or the like. The subject causes the tone intensity to decrease to a just-inaudible level, immediately after which he causes the tone to increase to a just-audible level, repeating this procedure continuously as the tone frequency increases gradually. The results are readily recorded in ink on semi-log paper and provide data regarding the absolute threshold for pure tone as a function of frequency in the XY recorder 46. To achieve information as to the auditory discomfort level for pure tones, the same test stimulus as utilized in obtaining information as to absolute auditory threshold for pure tones in utilized. The subject again (referring to FIG. 8 in the operate mode) uses the hand held switch 43 to control the intensity of the tone. The subject causes the tone intensity to increase to a level of distinct discomfort immediately after which he causes the tone intensity to decrease to a level which is tolerable, repeating this procedure continuously as the tone frequency increases gradually. The results are recorded in ink on semi-log paper on the XY recorder 46 and provide data regarding intensity as a function of frequency which produces auditory discomfort.

From the observed results of the absolute threshold and the auditory discomfort curves, as obtained in the above manner, a hearing examiner will select a general filter network of a type (e.g., bandpass or highpass) and frequency range so corresponding to the broad range of acuity deficiency. Such filter (e.g., 54, 55, or 56 in FIG. 9) or filter combination, is initially selected to generally provide compensatory amplification in steps in the general frequency band which requires amplification. To determine more precisely the proper range and type selection to be made, the two curves mentioned previously may be used to determine the patient's required response curve in a manner disclosed in the previously mentioned patent application Ser. No. 229,309.

Referring now to FIG. 9 in the sound field mode, the receiver is coupled to the subject's ear by means of a custom fitted earmold or the like. The stimulus fed to the microphone 48 is recorded continuous discourse, preferably a short paragraph which is reiterated. The subject is required to make a forced-choice judgement, as the examiner presents the master hearing aid parameters in pairs. The individual filters (e.g. 54, 55 55 and 56) may be of any practical number to divide the selected broad frequency range into narrower ranges. For example, the subject listens to a brief period of continuous discourse with the master hearing aid set at a highpass filter 54, 55, or 56 and then to a similarly brief period of continuous discourse with the master hearing aid set at a highpass filter 54, 55, or 56. The subject is then required to choose which condition was "best".

By using similar forced-choice paired comparison, the "best" condition is determined for each parameter. The Master Hearing Aid 49 is then so set, and, the calibration mode of FIG. 8 is used to record on recorder 46 the final prescription or curves from which the examiner determines the filter, filter gain and flat gain combination which will provide the best qualitative performance and which will be implemented in a system such as FIG. 1 as a single filter network.

The subject is then coupled with an appropriate hearing aid, such as the Master Hearing Aid 49 which hearing aid has its parameters adjusted as described above. A recorded formalized word test, such as C.I.D. Auditory Test W–22 is then administered at a conversational loudness level, i.e., 65 dB S.P.L. and the subject's score on such test is noted. If the score obtained on the word test is not satisfactory, i.e., less than 80 percent, the above tests as to the forced-choice paired comparison may be readily repeated.

Further refinements may be accomplished through analysis of information obtained on an accompanying questionaire, which will provide data regarding the subject's qualitative evaluation of the hearing aid in real life listening conditions.

Electronic circuitry is provided which receives input signals and feeds them through a preamplifier, and then to two paths, one through a filter network, so chosen to compensate for a hearing deficiency and one through a flat gain control. Then, both signals are summed at a summation amplifier which also drives a receiver to achieve compensatory amplification in a prosthetic device in a practical wearable form.

It is especially noteworthy that an automatic gain control is associated with the filter network and that a separate automatic gain control is associated with the preamplifier.

It has been pointed out earlier that attempts to compensate for a subject's hearing loss by adjusting the frequency response of an acoustic transmission system so that such response mirrors the subject's absolute auditory threshold are largely futile, simply because humans do not respond to threshold stimuli in real-life listening situations. Only supra-threshold stimuli are of significance to the subject, and it is well known that the frequency response of the ear to supra-threshold stimuli is markedly different from its response to threshold stimuli. Ideally, then, an acoustic transmission system designed to compensate for hearing loss should provide a frequency response which varies so that it is appropriate for low intensity stimuli when low intensity stimuli are present, and for high intensity stimuli when high intensity stimuli are present.

While embodiments and applications of this invention have been shown and described, it will be apparent to those skilled in the art that many more modifications are possible without departing from the inventive concepts herein described. The invention thereof is not to be restricted except as necessary by the prior art and by the spirit of the appended claims.

What is claimed as new and desired to be secured by Letters Patent of the United States is:

1. Apparatus for providing compensatory amplification for aurally handicapped persons comprising:

input circuit means for receiving signals to be amplified over a selected first and second pass band;

flat gain control means coupled with said input circuit means for controlling the amplitude of the signals from said input circuit means over the first pass band;

a single filter means coupled to said input circuit means for controlling the amplitude of the signals from said input circuit means over the second pass band;

summation means coupled to the outputs of said flat gain control means and said single filter means for combining the signals from the outputs of said single filter means and said flat gain control means;

dual automatic gain control means coupled to the output of said summation means for controlling the overall signal compression and the compression of the signals over the second pass band; and output circuit means coupled with said summation means for receiving the combination signals.

2. The apparatus as in claim 1 wherein said dual automatic gain control means includes a broadband means coupled to said input circuit means for controlling the overall signals compression.

3. The apparatus as in claim 1 wherein said dual automatic gain control means includes a narrow-band means coupled to said filter means for controlling the compression of the signals over the second pass band.

4. The apparatus as in claim 2 wherein said dual automatic gain control means includes a narrow-band means coupled to said filter means for controlling the compression of the signals over the second pass band.

5. The apparatus as in claim 1 wherein the cut-off frequency of said single filter means is adjustable.

6. The apparatus as in claim 5 including means for providing gain control coupled with said adjustable frequency single filter means.

7. The apparatus as in claim 1 wherein separate adjustable automatic gain control means is coupled with said single filter means.

8. The apparatus as in claim 1 wherein said input circuit means includes a microphone coupled with an amplifier, said amplifier being electrically coupled with the input of said flat gain control means and the input of said single filter means.

9. The apparatus as in claim 8 wherein said single filter means is adjustable and including means for providing gain control coupled with said adjustable filter means.

10. The apparatus as in claim 1 wherein said active single filter means is formed of integrated circuits.

11. The apparatus as in claim 1 including preamplification means coupled to the output of said input circuit means for amplifying the signals from the output of said input circuit means.

12. The apparatus as in claim 1 including volume control means connected between the output of said summation means and the input of said output circuit means controlling the volume of the combined flat gain and filter signals.

13. The apparatus as in claim 1 wherein said output circuit means includes receiver means coupled therewith for transducing the combined signals into acoustical signals.

14. The apparatus as in claim 1 wherein said single filter means includes a highpass filter.

15. The apparatus as in claim 1 wherein said single filter means includes a bandpass filter.

16. The apparatus as in claim 1 wherein said summation means includes an operational amplifier having a positive input and a negative input, the output of said flat gain control means being connected to said positive input and the output of said single filter means being connected to said negative input.

17. The apparatus as in claim 1 wherein said summation means includes an operational amplifier having a positive input and a negative input, said positive input being grounded and the outputs of said flat gain control means and said single filter means being connected to said negative input.

18. The apparatus as in claim 11 including automatic gain control means connected between the output of said summation means and said preamplifier means for controlling the gain of said preamplifier means.

19. The apparatus as in claim 11 wherein an automatic gain control means is coupled with said preamplifier means.

* * * * *